Aug. 30, 1960

R. J. McCURDY 2,951,205

RANGE MARKS GENERATOR

Filed Dec. 24, 1958

INVENTOR.
ROBERT J. McCURDY
BY

ATTORNEYS

United States Patent Office 2,951,205

Patented Aug. 30, 1960

2,951,205

RANGE MARKS GENERATOR

Robert J. McCurdy, Maple Shade, N.J., assignor, by mesne assignments, to the United States of America as represented by the Secretary of the Navy Filed Dec. 24, 1958, Ser. No. 782,986

6 Claims. (Cl. 328—66)

This invention relates to a pulse generator and more particularly to a gated and triggered single-swing blocking-oscillator.

In the prior art range or timing markers for this type have been generated by gating a ringing oscillator or Hartley oscillator, and shaping the sine waves to give the desired pulses. This method has two major disadvantages: (1) the oscillator requires critical non-standard coils and (2) the gating process causes frequency shift for the first few cycles of oscillation, resulting in inaccuracies in the first two or three markers. A further disadvantage has been the necessity for many high tolerance and critical parts, and since the frequency was dependent upon many circuit parameters even a slight change in temperature would result in throwing the markers off calibration.

It is therefore an object of the present invention to provide a pulse generator which is extremely simple and stable in operation.

Another object is the provision of a pulse generator which is adjustable in frequency over a wide range.

A further object is to provide a pulse generator in which only standard parts are utilized.

A still further object is to provide a gated pulse-generator in which all the pulses are in the same timed relation throughout the duty cycle.

Still another object is the provision of a pulse generator in which a minimum of precision components is necessary.

According to the invention a single-swing blocking-oscillator is triggered by integrating the blocking oscillator plate voltage when the tube is cut off and applying this integrated voltage through a biased diode to the conrol grid of the blocking oscillator to generate a pulse. The biased diode prevents the next pulse from being generated until the integrated wave form overcomes the bias applied to the diode. Triggering and gating circuits preferably are employed to synchronize the blocking oscillator and squelch it when desired. Thus the necessity for precision tuners and complex pulse shaping networks is obviated, and the result is a precision pulse generator in which the first pulse can be timed in perfect synchronization with any timed phenomena.

Figure 1:
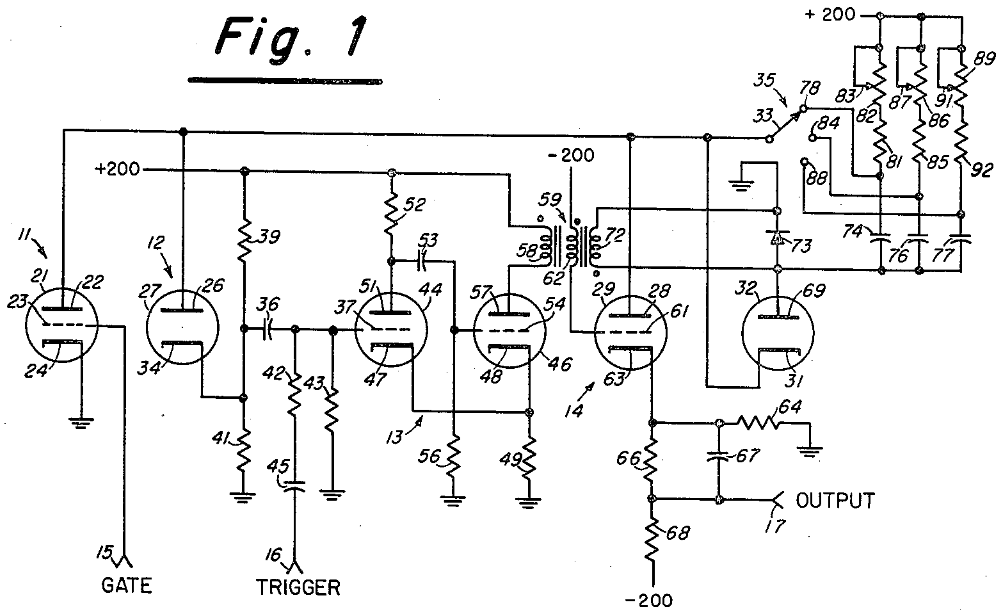
Figure 2:
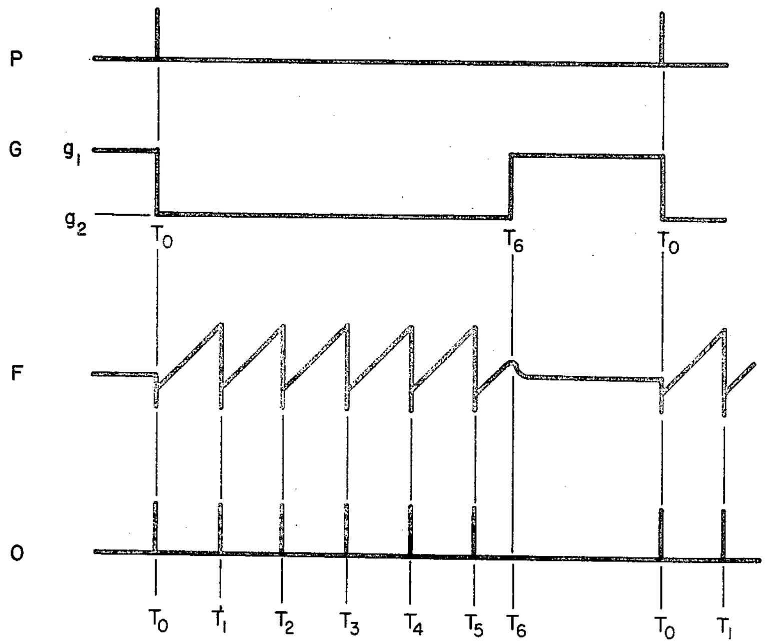

Other objects and features of the invention will become apparent to those skilled in the art as the disclosure is made in the following detailed description of the preferred embodiment illustrated in the accompaning sheet of drawing in which: Fig. 1 is a schematic diagram of a preferred embodiment of the present invention, and Fig. 2 shows the typical wave forms present at various points of the embodiment illustrated in Fig. 1.

Referring now to the drawing and in particular to Figure 1 there is shown at 11 a gating circuit directly coupled to a biased diode 12 which is capacitively coupled to an amplifier 13. The amplifier output is inductively coupled to a blocking oscillator 14 the output of which is coupled back to the biased diode 12, to be explained in greater detail. Provision is made for the insertion of a gate at 15 and a trigger P at 16 the operation of which will also be described in greater detail. An output O, is taken at 17. These waveforms, along with the waveform F coupled back to the biased diode, are illustrated in Fig. 2.

The gating circuit 11 comprises vacuum tube 21 having a plate 22, control grid 23 and cathode 24. The plate 22 is connected to plate 26 of diode 27, and to plate 28 of triode 29, to the cathode 31 of diode 32, and to switch arm 33 of switch 35. Cathode 34 of diode 27 is coupled through capacitor 36 to grid 37 of triode 44 and also resistors 39 and 41, the other end of resistor 39 being connected to the positive side of the power supply, and the other end of resistor 41 being grounded. Also connected to grid 37 are resistors 42 and 43, the other end of resistor 42 being connected through capacitor 45 to the trigger input 16 and the other end of resistor 43 being grounded. The amplifying tubes 44 and 46 are indicated as triodes with their cathodes 47 and 48 connected together and through a resistor 49 to ground. The plate 51 of vacuum tube 44 is connected through resistor 52 to the positive terminal of the power supply and through capacitor 53 to the grid 54 of vacuum tube 46. Grid 54 of tube 46 is also connected through resistor 56 to ground. The plate 57 is connected through winding 58 of transformer 59 to the positive side of the power supply. The grid 61 of blocking oscillator 14 is connected through winding 62 of transformer 59 to the negative side of the power supply. The cathode 63 of blocking oscillator 14 is connected through resistor 64 to ground and resistor 66 and capacitor 67 in parallel to the output terminal 17. Output terminal 17 is connected through resistor 68 to the negative side of the power supply. Plate 69 of diode 32 is connected through winding 72 and rectifier 73 in parallel to ground. Rectifier 73 has its negative side grounded. Plate 69 is also connected to one plate of capacitors 74, 76, and 77. The other plate of capacitor 74 is connected to terminal 78 of switch 35 and through resistors 81 and 82 to the positive side of the power supply. In a like manner capacitor 76 is connected to terminal 84 of switch 35 and through resistor 85 and 86 to the positive side of the power supply. The capacitor 77 is connected to contact 88 on switch 35 and through resistors 92 and 89 to the positive side of the power supply. Resistors 82, 86, and 89 have slidably adjustable contacts 83, 87, and 91, respectively.

*Initial circuit conditions*

Tube 21 is operated at zero bias and is fully conducting. Tube 27 is biased by the voltage divider resistors 39 and 41 at cathode 34 and is non-conducting since the conduction of the plate current of tube 21 holds plate 26 of diode 27 at a potential below the cathode potential set by the voltage divider resistors 39 and 41. Tubes 44 and 46 are both conducting and act together as a high gain amplifier. Common cathode resistor 49 provides the bias for both tubes. Tube 29 is biased to cutoff by the negative potential applied to grid 61 in conjunction with the fixed potential set by voltage divider resistors 64, 66, and 68 in the cathode circuit.

*Circuit operation*

Referring to Figure 2, the negative gate G and positive trigger P occur simultaneously at $t_0$. The trigger P is applied to terminal 16 through capacitor 45 and resistor 42 to grid 37 of tube 44. Trigger P is then amplified by amplifier 13 through tubes 44 and 46 and coupled through transformer 59 to grid 61 of tube 29. The phasing of transformer 59 is such that trigger P arrives at grid 61 as an amplified positive pulse, driving tube 29 into conduction. The plate current of tube 29 flows through resistors 81 and 82 through the switch contact switch arm 33 and contact 78 as shown to the plus 200 volt power supply terminal. This current drives the plate 28 of tube 29 more negative than the previous conduction of tube 21 and thereby causes a drop in voltage across capacitor 74. Since the top plate of capacitor 74 is driven negative and the charge cannot be instantaneously removed this gradient of voltage will appear across transformer winding 72 and cause a rush of current through this winding discharging capacitor 74. Windings 72 and 62 of transformer 59 are so phased that this current through winding 72 will couple a pulse to winding 62 which will drive the grid 61 of tube 29 more positive. This in turn causes more current flow through tube 29 dropping the plate 28 to an even lower potential and discharging capacitor 74 completely. Diode 73 is placed across winding 72 to prevent the bottom plate of capacitor 74 from assuming a positive potential. When capacitor 74 is completely discharged there is no more current through winding 72 and hence the positive potential at grid 61 begins to rapidly decrease. This in turn causes less plate current to flow through tube 29 raising the voltage at the plate 28 causing capacitor 74 to begin charging in a positive direction. As the trigger P falls back to zero tube 29 is again cut off by the fixed bias. Tube 21 during this previously described action has been cut off by a gate G shown in Figure 2. At this point, since both tubes 21 and 29 are cut off, capacitor 74 charges exponentially toward the plus 200 volts through resistors 81 and 82. This waveform is illustrated as waveform F in Figure 2. At time T1 the capacitor has accumulated a charge more positive than the cathode bias on diode 27 will start conducting since its plate 26 is more positive than its cathode 34, coupling a positive wave front through to grid 37 of tube 44. This wave front is amplified in amplifier 13 and applied to grid 61 of tube 29 as a positive wave front exactly as the initiating trigger P was previously applied. This will cause tube 29 to conduct dropping the voltage at plate 28 and again discharging capacitor 74 through transformer winding 72. Plate 26 of diode 27 is automatically dropped in potential due to the plate current of tube 29 through resistors 81 and 82, to a point below the cathode 34 potential set by resistors 39 and 41. Thus the same action will repeat itself, capacitor 74 completely discharging through transformer winding 72, and the positive pulse disappearing due to the cut-off of tube 27. Again tube 29 will assume its original cut-off condition and capacitor 74 will again start to charge toward the plus 200 volts through resistors 81 and 82. This action will repeat itself until gate G applied to the grid 15 of tube 21 returns from the negative amplitude G2 to the positive amplitude G1 driving tube 21 back into conduction and holding the plate 26 of diode 27 at a point more negative than the cathode 34. At that time capacitor 74 will no longer be charging toward plus 200, but will assume a charge as defined by the voltage drop due to the plate current flow of tube 21 through resistors 81 and 82. Cathode resistors 66 and 68 form a signal voltage divider. The output is taken at the junction of these resistors and is illustrated as waveform O in Figure 2. As can be seen this output is a series of equally-spaced equal-amplitude positive pulses occurring at the time tube 29 is driven into conduction. Diode 32 is placed across capacitor 74 to prevent capacitor 74 from ever obtaining a negative charge and thus clamping the starting point at zero potential. The frequency of the range marks of the output pulses is determined by the time it takes capacitor 74 to charge up to a point where diode 27 conducts. This of course is determined by the values of capacitor 74 and resistors 81, 82, 39, and 41. The latter two resistors determine the potential which must be attained to cause diode 27 to conduct. The frequency then can be adjusted by changing the value of any one of these components. In this embodiment resistor 82 is made variable as a fine adjustment on the frequency of the output pulse. Also as a course adjustment, different resistance-capacitance networks are shown which can be switched in by switch 35 as desired.

The power supply has not been illustrated since any conventional regulated power supply having the proper outputs will suffice. As previously described there are two voltages available a plus 200 and a minus 200, ground being the reference.

Obviously many modifications and variations of the present invention are possible in the light of the above teachings. It is therefore to be understood that within the scope of the appended claims the invention may be practiced otherwise than as specifically described.

I claim:

1. A pulse generator comprising a first amplifier having an input and an output; a second amplifier having at least an anode, a cathode, and a control element, said control element coupled to said anode through regenerative coupling means and to the output of said first amplifier; a saw-tooth generator having an input connected to said anode and an output connected through a threshold device to the input of said first amplifier; said threshold device being biased as to not allow said second amplifier output to reach said first amplifier input until said saw-tooth generator output reaches a predetermined amplitude.

2. The pulse generator of claim 1 wherein said regenerative coupling means includes a transformer inductively coupling said second amplifier anode to said second amplifier control element.

3. The pulse generator of claim 2 wherein said saw-tooth generator comprises a resistor-capacitor network.

4. The pulse generator of claim 3 wherein said transformer includes a primary and secondary winding, said anode connected to one side of said primary winding through said capacitor, the other side of said primary winding connected to a common reference, said anode connected to a positive voltage through said resistor, said control element connected through said secondary winding to a negative voltage whereby said second amplifying means is biased below cut-off, and load means connecting said cathode element to said common reference.

5. The pulse generator of claim 1 including gating means connected to said threshold device, operable to be capable of periodically disabling said threshold device.

6. The pulse generator of claim 5 including triggering means coupled to said first amplifier input in time synchronization with said gating means, whereby an output pulse will be initiated at the start of said gating means.

References Cited in the file of this patent

UNITED STATES PATENTS

| | | |
|---|---|---|
| 2,509,792 | Westcott | May 30, 1950 |
| 2,597,322 | Higinbotham | May 20, 1952 |
| 2,676,251 | Scarbrough | Apr. 20, 1954 |